Aug. 26, 1969
W. F. MOTT ET AL
3,463,499
I.D. COLLET CHUCK
Filed July 10, 1967
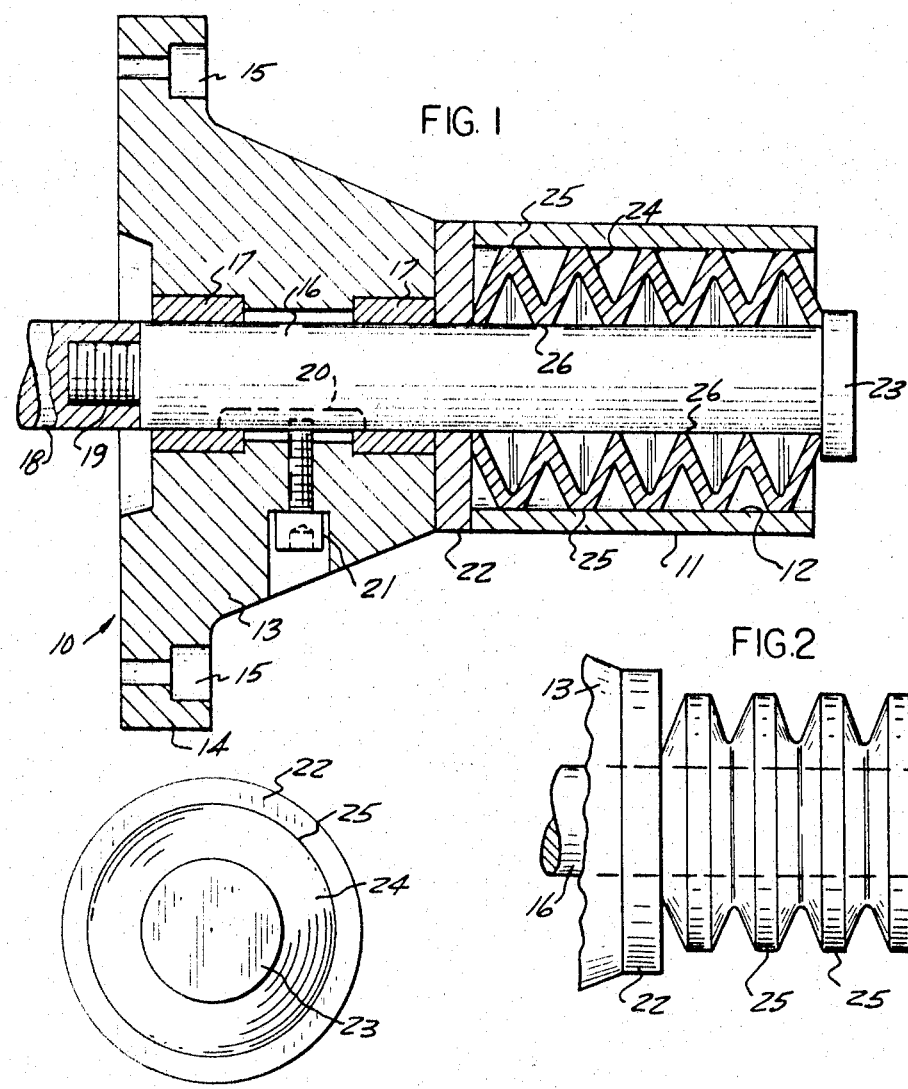
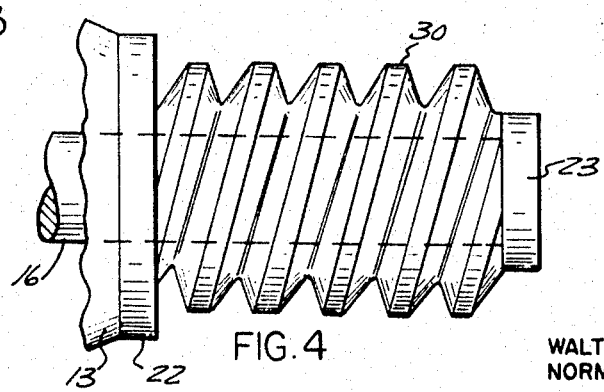
INVENTORS
WALTER F. MOTT
NORMAN E. RANK
BY Cullen, Sloman, & Cantor
ATTORNEYS

United States Patent Office 3,463,499
Patented Aug. 26, 1969

3,463,499
I.D. COLLET CHUCK
Walter F. Mott, St. Clair Shores, and Norman E. Rank, Birmingham, Mich. (both of 2160 E. Nine Mile Road, Warren, Mich. 48091)
Filed July 10, 1967, Ser. No. 652,217
Int. Cl. B23b 31/40
U.S. Cl. 279—2                                    1 Claim

ABSTRACT OF THE DISCLOSURE

An I.D. collet chuck, for chucking against an internal opening in a workpiece, including an elongated, uniformly circumferentially corrugated, stiff, but relatively resilient, tube, having a headed drawbar extending therethrough, with the tube located between the drawbar head and a workpiece seat, so that movement of the drawbar towards the seat compresses the length of the tube while uniformly expanding its outer diameter to thereby grip against the wall defining the opening in the workpiece.

BACKGROUND OF INVENTION

In manufacturing various types of workpieces having large openings therethrough, it frequently becomes necessary to chuck or grasp the workpieces internally. For example, in machining or grinding a tube or cylinder, it frequently is necessary to hold the cylinder internally rather than externally.

Conventional internal chuck devices, commonly referred to as I.D. collet chucks, are made of a tube having a longitudinally slotted wall, with the internal opening in the tube being tapered. A drawbar inserted in the tube, and having a wedge-shaped outer surface, spreads the tube for grasping or chucking against the wall defining the opening in the workpiece.

Other conventional I.D. collect chucks are essentially as described above but with ramifications of the internal shape of the slotted collet tube, such as using a double taper, that is, tapering from both ends of the tube and using a double tapered drawbar arrangement.

These prior art chucks are troublesome in that the salts permit the entry of chips, dust and fluid into the bushings and supports for the drawbars, causing damage and inaccuracies. Further, because of the nature of the drawbar being wedge-shaped and incrementally expanding the collet, the collet tends to exert a non-uniform, radially outward force upon the workpiece thereby stressing and distorting the workpiece non-uniformly. The end result is machining inaccuracies.

SUMMARY OF INVENTION

Thus, it is an object of this invention to provide an I.D. chuck collet which will utilize a drawbar for expanding a collet tube, but with the tube being formed to expand uniformly, throughout its length, to thus supply a uniform force upon the workpiece along the length of the collet.

A further object of this invention is to form a collet chuck of a corrugated appearing tube with the tube being unslotted, and that is, without openings, except at its opposite ends, and being arranged to uniformly expand diametrically as it is compressed by the drawbar.

Summarizing, the invention herein contemplates forming an I.D. collet chuck utilizing a resilient, but stiff metal tube which is corrugated with approximately V-shaped corrugations, so that compression of the tube by the drawbar moving the tube against a workpiece seat, uniformly expands the outer diameter of the tube to thereby uniformly grip against the workpiece.

These and other objects and advantages of this invention will become apparent upon reading the following description, of which the attached drawings form a part.

DESCRIPTION OF DRAWINGS

FIG. 1 illustrates a cross-sectional view of an I.D. collet chuck with a workpiece mounted thereon.

FIG. 2 is a fragmentary, elevational view, of the workpiece grasping end of the chuck and FIG. 3 is an end view taken in the direction of arrows 3—3 of FIG. 2.

FIG. 4 is a view similar to FIG. 2, but showing a modification wherein the chuck tube is helically corrugated.

DETAILED DESCRIPTION

FIG. 1 illustrates an I.D. collet chuck 10 for chucking a tubular or cylindrically shaped workpiece 11 having an internal opening 12 whose wall is to be grasped and held by the chuck.

The chuck comprises a chuck body 13 having a flange 14 with bolt openings 15 for fastening to a machine tool, such as a lathe or the like. The manner of fastening the chuck to the machine tool is familiar to those skilled in the art. The drawbar 16, surrounded by support bushings 17, extends through the chuck body and its inner end is secured to the machine tool drawbar 18 by means of a threaded connection 19, as is conventional.

The drawbar is provided with a longitudinally arranged slot 20 to receive the end of a set screw 21, loosely inserted into the slot to prevent rotation of the drawbar and permit the drawbar to move longitudinally only.

On the end of the chuck body is arranged a suitably sized workpiece stop or rest ring 22 and spaced therefrom on the ends of the drawbar is a head configuration 23. Between the head 23 and the rest ring 22 is arranged the collet tube 24, which is in the form of a corrugated tube surrounding the drawbar.

This tube is preferably formed of a stiff, yet resilient material, such as suitable spring steel and is formed into a substantially V-shaped corrugation arrangement with the outer edges 25 being flattened and its inner edges 26 likewise being flattened and contacting the surface of the drawbar.

OPERATION

In operation, the drawbar is moved to the right, as referred to in FIG. 1, which relieves pressure upon the collet tube 24. The workpiece is then slipped over the collet tube as illustrated in FIG. 1. Thereafter, the machine drawbar 18 is operated to move the drawbar 16 towards the left, so that its head compresses the collet tube towards the workpiece stop 22.

Due to the shape of the corrugations and the resiliency of the material, the drawbar thereby compresses the tube which uniformly expands so as to uniformly grip the workpiece internally.

MODIFICATION

FIG. 4 illustrates a modification which is identical to the device previously described in connection with FIGS. 1–3, except that the collet tube 30 is helically corrugated so as to resemble a screw in outer shape. Either a right or left hand helix may be used, as desired.

With this configuration, the expansion of the collet tube 30 against the workpiece tends to move the workpiece downwardly into tighter contact with the workpiece stop 22.

This invention may be further developed within the scope of the following claim. Accordingly, it is desired that the foregoing description be read as being merely illustrative of an operative embodiment of this invention and not in a strictly limited sense.

Having fully described an operative embodiment of this invention, we now claim:

1. An I.D. collet chuck comprising:
   an annular workpiece seat plate;
   a drawbar extending through said seat plate and having a radially enlarged head at one end;
   an elongated chuck tube surrounding said drawbar and having its opposite ends abutting said drawbar head and seat plate, respectively, said chuck tube being of stiff but springy metal and having uniform and identical radial corrugations of V-shaped cross-section from end to end, inclusive; the outer and inner crests of said corrugations being flattened for contact with the inner wall of the workpiece and the outer surface of said drawbar, respectively;
   said drawbar being longitudinally movable to compress said tube between said drawbar head and said seat plate, thereby causing all of said corrugations to uniformly flex and expand radially so that all of said tube outer edges grip the inner wall of the workpiece with equal force.

References Cited

UNITED STATES PATENTS

| | | | |
|---|---|---|---|
| 2,818,264 | 12/1957 | Overstreet | 279—2 |
| 2,893,742 | 7/1959 | Fröhner | 279—2 |
| 3,073,610 | 1/1963 | Mackinder et al. | 279—2 |

FOREIGN PATENTS 514,431 2/1955 Italy.

OTHER REFERENCES

Baxter, Thomas: Expanding Mandrel in The Tool Engineer, vol. 44, No. 14, page 90. April 1960.

ROBERT C. RIORDON, Primary Examiner